May 28, 1940.   J. VISSER   2,202,277
INSTRUMENT PANEL ASSEMBLY
Filed June 3, 1939   3 Sheets—Sheet 1
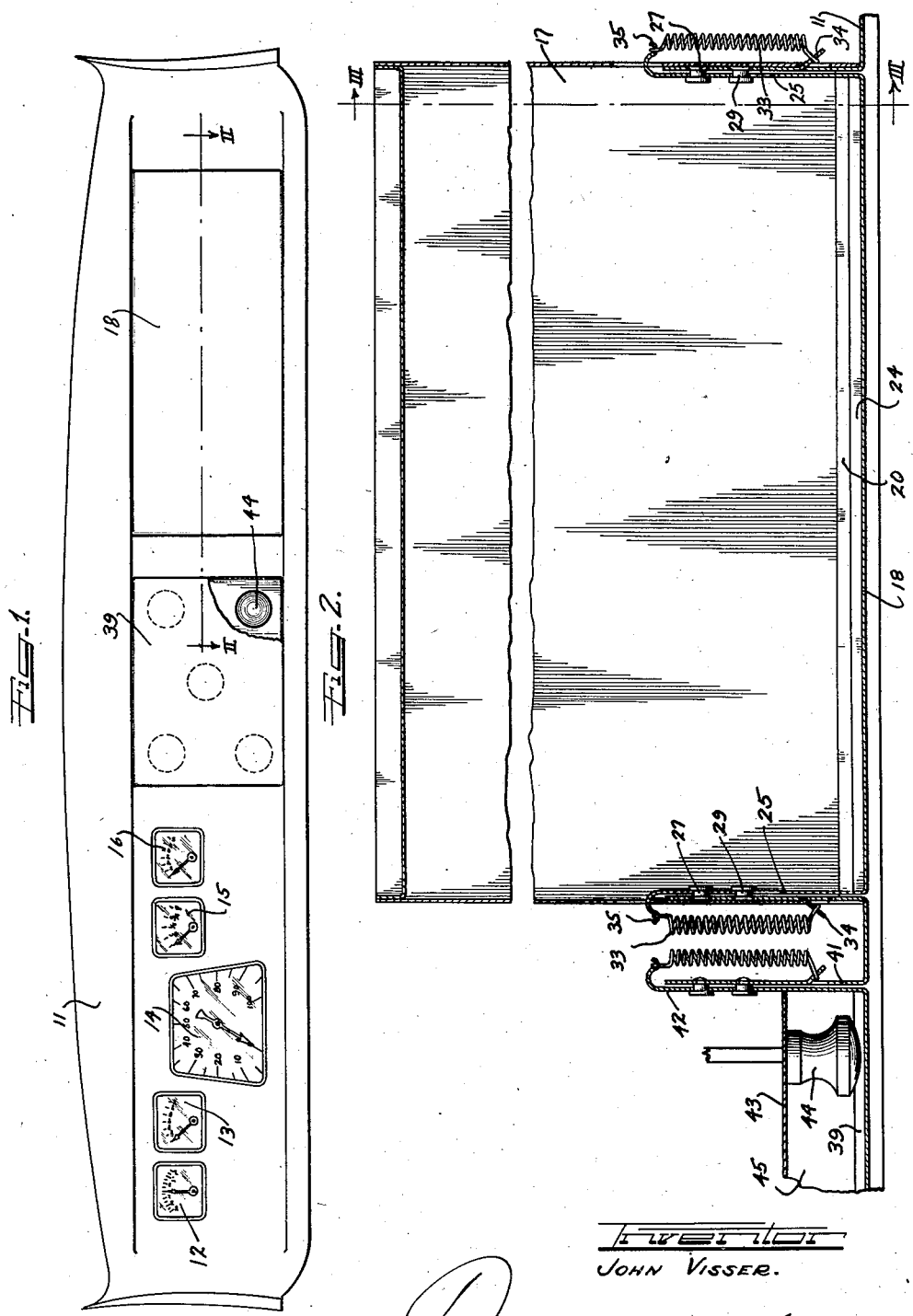
Inventor
John Visser.
by Charles T. Hill
Atty.

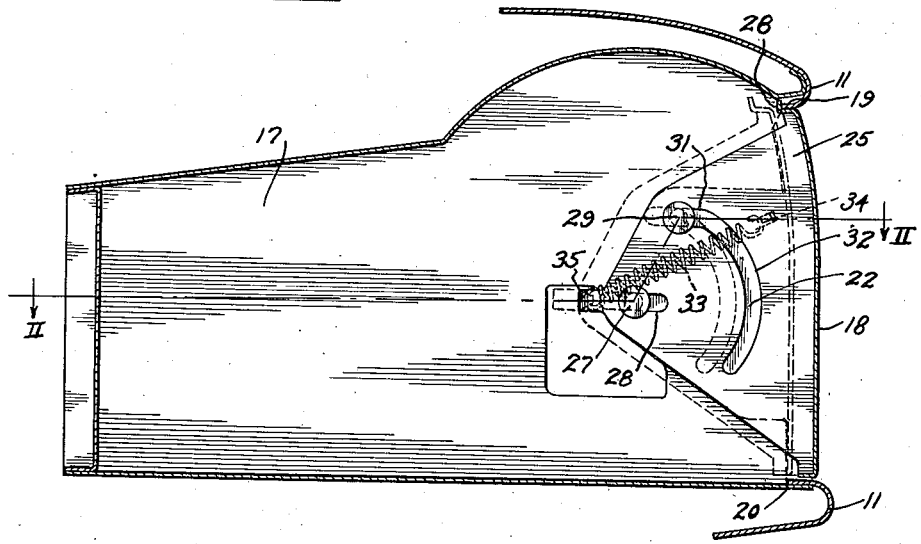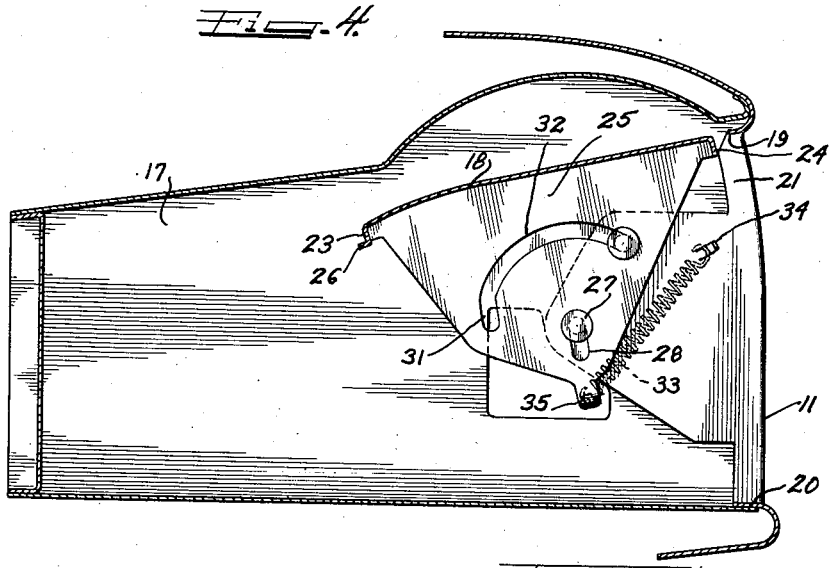

May 28, 1940.   J. VISSER   2,202,277
INSTRUMENT PANEL ASSEMBLY
Filed June 3, 1939   3 Sheets-Sheet 3
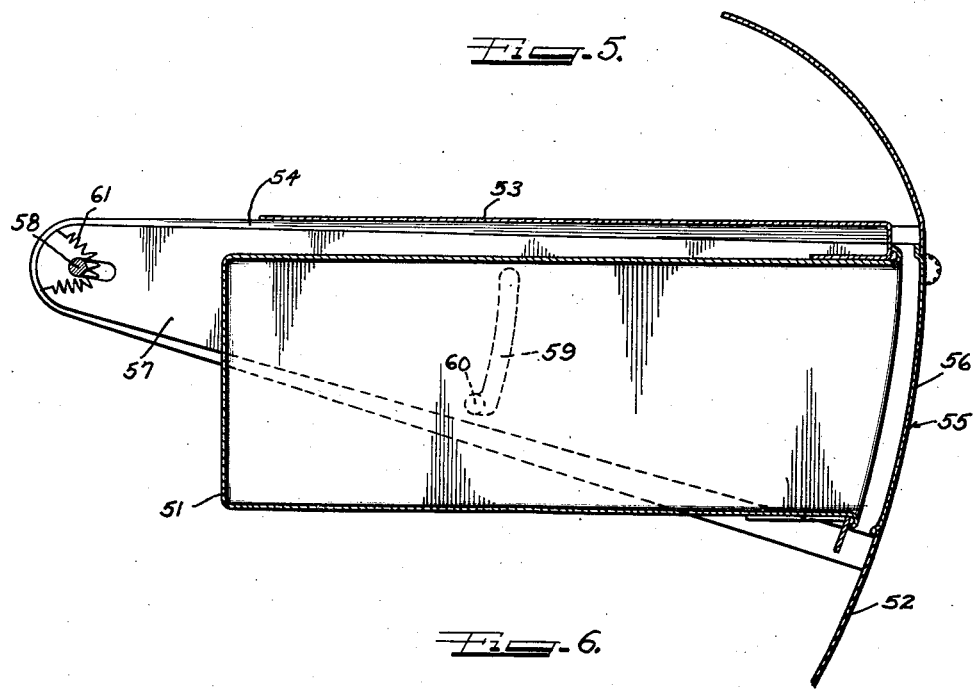
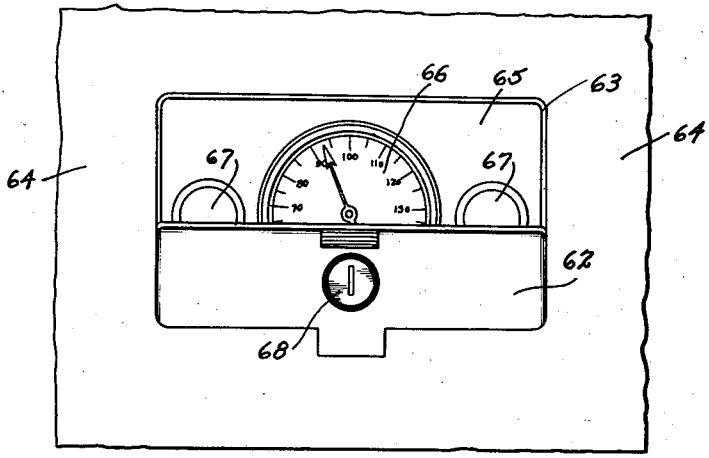
Inventor
JOHN VISSER.
by Charles T. Hill
Attys.

Patented May 28, 1940

2,202,277

UNITED STATES PATENT OFFICE 2,202,277

INSTRUMENT PANEL ASSEMBLY

John Visser, Grand Rapids, Mich., assignor, by mesne assignments, to Reconstruction Finance Corporation, Detroit, Mich., a corporation of the United States Application June 3, 1939, Serial No. 277,245

13 Claims. (Cl. 180—90)

This invention relates to vehicle bodies, such as are used on automobiles, and more particularly to the panel generally extending across the interior of the front of such vehicle bodies below the windshield and commonly known as the instrument panel.

The instrument panel of vehicles such as automobiles serves not only to carry the instruments, such as the speedometer, ammeter, oil pressure gauge, gasoline gauge and the like, but also generally serves to carry a number of the controls of the automobile, such as the ignition switch, the light switch, and the choke and hand throttle control. In recent years, automobiles have been provided with a small storage compartment, generally known as the "glove compartment," behind the instrument panel, the instrument panel being provided with a door for permitting access to the compartment. As it is generally constructed at the present time, the door to the glove compartment swings out and down and is provided with a projecting knob by means of which it may be moved from its closed to its open position.

In recent years, radios have become very common equipment upon automobiles, and the radio control knobs are generally mounted upon the instrument panel. The addition of a radio and glove compartment and the transfer of controls from other positions, such as the steering column, to the instrument panel has resulted in a large increase in the number of knobs on the ordinary instrument panel and has practically eliminated instrument panels without knobs.

The presence of protruding knobs on the instrument panels of automobiles often turned what would have been a minor accident into a severe one, for a passenger who would have been merely bruised if thrown forward against a smooth instrument board by a collision would receive fractures of the facial bones upon striking the protruding knobs of a conventional instrument panel.

The principal object of this invention is to provide an instrument panel assembly in which there are no dangerous protruding knobs and which nevertheless carries the conventional number of controls and is provided with a "glove compartment".

Another object of this invention is to provide a closure for an opening in an instrument panel, the closure being of such a character that it can be opened by pressure applied to its face, thereby dispensing with the need of a knob.

Another object of the present invention is to provide a storage compartment in an instrument panel, the opening of the storage compartment being provided with a closure which fits flush with the surrounding portion of the instrument panel and which can be moved back out of the opening and then swung away from behind the opening to allow access to the compartment.

Another object of the present invention is to provide an instrument panel having a storage compartment located behind it and reached through an aperture in the instrument panel, the aperture being closed by a closure which normally fits flush with the adjacent surface of the instrument panel and which can be moved bodily back out of the opening and then swung up and back about a horizontal axis lying behind the opening to a position substantially horizontal and level with the top of the opening.

Another object of the present invention is to provide an instrument panel having an opening and a closure for said opening arranged to swing to a horizontal position immediately behind one edge of the opening without striking an object, such as a sub-panel, located directly behind the opening.

Another object of this invention is to provide a closure for an aperture in a panel, the closure being movable from a position in the aperture to a position behind and in line with one edge of the aperture and spring means being provided to hold the closure in either of its terminal positions.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a face view of an automobile instrument panel constructed according to my invention;

Figure 2 is a section taken approximately on the line II—II in Figure 1 and looking down in the direction of the arrows, the section being jogged as shown by the line II—II in Figure 3;

Figure 3 is a cross section taken on the line III—III of Figure 2 and looking in the direction of the arrows;

Figure 4 is a cross section similar to Figure 3 but showing one of the members in a different position;

Figure 5 is a cross section of another embodiment of the invention;

Figure 6 is a face view of a third embodiment of the invention.

The form of the invention shown in Figures 1 to 4 comprises a stamped sheet metal instrument panel 11 which is adapted to be located in an automobile body in the conventional position, that is, extending across the inside of the body at the front immediately below the windshield. The left hand end of the instrument panel 11 carries the conventional instruments such as an ammeter 12, an engine temperature indicating device 13, a speedometer 14, a gasoline gauge 15, and an oil pressure gauge 16. The left end of the instrument panel 11 carrying the instruments is, in the great majority of automobiles, the end behind which is seated the driver of the vehicle, and the instruments are thus located in a position where they may be easily read by the driver. Of course, in automobiles having the driver's position at the right, as is the convention in Great Britain and certain other portions of the world, the instruments 12, 13, 14, 15, and 16 would be placed at the right end of the instrument panel, the entire layout of the panel being reversed end for end.

The location of the instruments 12, 13, 14, 15, and 16 at the end of the panel 11 directly in front of the driver creates no hazard for the driver, or any other occupant of the vehicle, in spite of the fact that the faces of the instruments are generally covered with glass, because this portion of the instrument panel is ahead of the steering wheel which prevents anyone from being thrown up against it and fracturing and being cut on the glass of the instruments.

The right hand end of the instrument panel 11 carries a small storage compartment 17 of the type ordinarily called a "glove compartment" and located in back of the panel 11. Access to the compartment 17 is permitted by means of a rectangular opening in the instrument panel 11, this opening being normally closed by a sheet metal closure or door 18 fitting within the opening and normally lying flush with the portions of the instrument panel 11 at either side of the opening.

The edge of the instrument panel 11 around the opening of the storage compartment is bent back to form flanges 19, 20, and 21 at the top, bottom, and sides of the opening, as shown in Figure 4. The flanges 21 at the sides of the opening are formed with extensions 22 which project back and support the mechanism by means of which the door 18 is supported and guided.

The edges of the door 18, which is preferably stamped out of sheet metal, are bent back to form strengthening flanges 23, 24, and 25 along the top and bottom and the sides of the door, the flanges 25 at the sides of the door extending back a considerable distance from the face of the door and forming supporting members for the door. The edge 26 of the flange 23 along the top of the door 18 is bent up to form an abutment or stop placed so as to bear against the edge of the flange 19 along the top of the opening in the panel 11 when the door 18 is in closed position.

The door 18 of the storage compartment 17 is provided with mechanism which enables it to be pushed back out of its normal position flush with the adjacent portion of the instrument panel 11 to a position, shown in dotted lines in Figure 3, from which it can be swung vertically away from in back of the opening without striking the flanges 19 or 20 at the top and bottom of the opening.

The door 18 may be arranged to swing either up or down, the particular example of the invention shown in Figures 1 to 4 having the door arranged to swing up. In this embodiment of the invention, the door guiding mechanism permits the door to swing about a horizontal axis which is located approximately level with the center of the opening for the door and which lies in back of the plane of the opening a distance equal to approximately half of the width of the opening from top to bottom. A door guiding mechanism providing an axis of swinging thus positioned allows the door 18 to be swung up to an approximately horizontal position behind the upper edge 19 of the door opening and it also provides that the upper edge 26 of the door will rise but a small distance above the upper edge 19 of the door opening as the door swings from its closed to its open position. This latter feature is especially important because it permits the door 18 to extend practically the full height of the instrument panel 11 and still have room entirely behind the instrument panel in which to operate.

The door guiding mechanism comprises the flange extensions or supporting members 22 and 25 at the ends of the door 18 and door opening and also the means interconnecting these supporting members. The rearwardly projecting supporting members 22 and 25 at each end of the door 18 and door opening are connected to each other by two pin and slot connections or their equivalents, one of these connections being located on the axis about which the door is to swing and the other connection being either closer to or further away from the plane of the door opening.

The connection mentioned above as lying on the axis about which the door 18 can swing has two principal characteristics. It allows the door 18 and the supporting member 25 integral with it to move bodily back and forth a short distance in a horizontal direction, this distance being great enough to allow the door 18 to be pushed back from its normal closed position shown in full lines in Figure 3 to the dotted line position shown in Figure 3 from which it can swing up without striking the flange 19 along the top of the door opening. The other characteristic possessed by this connection is that it permits the door to swing about the connection as a pivot. Although this connection may be a normally upright link pivoted at its ends to the supporting members 22 and 25 or a pivot journaled in one of the supporting members 22 and 25 and resiliently and movably carried, as by a spring, on the other of the supporting members 22 and 25, I have found that the simplest and, in general, most preferable form of connection to be used is the pin and slot connection employed in the particular embodiment of the invention shown in the drawings. In the structure shown in the drawings, the pin is formed by a stud 27 riveted to the supporting member 22 on the side of the door opening and the slot 28 is cut directly in the supporting member 25 integral with the door 18. This particular arrangement of the pin 27 and slot 28 is shown only by way of example, for the pin may be riveted to the supporting member 25 on the door and the slot may be provided in the supporting member 22 integral with the edge of the door opening, in which case a horizontally acting spring may be applied to the outer end of the pin for holding the door 18 flush in its opening when it is in its closed position. However, the arrangement shown in the drawings is the preferred form, as it allows the spring which is employed to perform a dual function, as explained in detail below. In any case, the slot 28 must extend in a direction having a substantial component normal to the plane of the door opening when the door is closed and is preferably horizontal as shown.

The second of the two connections between the supporting members 22 and 25 at each end of the door opening and door 18 also possesses two distinct characteristics. The first characteristic is that it permits and guides the movement of the door 18 bodily back out of the door opening, this guiding being done in cooperation with the first connection described above. The second characteristic required of the second connection is that it permit the door 18 to rotate about the pivot provided by the first connection after the door 18 has been pushed back out of the door opening.

The second connection between the supporting members 22 and 25 may be formed by a linkage, but I have found that a pin and slot connection, such as the one shown in the drawings, is much simpler and less expensive to manufacture. As with the first connection, the pin may be secured to either of the supporting members 22 and 25 and the slot cut directly in the other, but, in the example shown, the pin 29 is formed by a stud riveted to the supporting member 22 integral with instrument panel 11, and the slot 31, 32 is cut in the supporting member 25 integral with the door 18. The slot is formed of two portions 31 and 32, each of which permits the connection of which the slot forms a part to perform one of its two functions. The first part of the slot 31 is parallel to the slot 28 forming a part of the first pin and slot connection and is of the same length, thus permitting the door 18 to be slid bodily back. The second portion 32 of the slot forming a part of the second connection is uniformly curved and has, as its center of curvature, the point in the first connection which forms the pivot about which the door swings. In the particular embodiment of the invention shown in Figures 1 to 4 this center of curvature is at the end of the slot 28 nearer to the door 18, and the curved portion 32 of the slot of the second pin and slot connection not only permits the door 18 to be rotated about the first connection but also keeps the pin 27 located in the proper end of the slot 28 whenever the door is swung up from its closed position.

The particular embodiment of the invention shown in Figures 1 to 4 is provided with resilient means for holding the door 18 forward in the door opening in the position shown in full lines in Figure 3, and for also holding the door in its open position as shown in Figure 4. This means comprises a spring 33 at each end of the door, each spring 33 extending between a lug 34 struck out from the supporting member 22 extending back from the instrument panel 11 and an ear 35 formed on the end of the supporting member 25 integral with the door 18. The lug 34 and the ear 35 are located so that, when the door is in its closed position as shown in Figure 3, the spring 33 will extend in a direction which has a large horizontal component. Thus the spring, which is under tension, will pull the door 18 forward into the door opening.

The stationary lug 34 and the ear 35 on the moving supporting member 25 are also located so that the spring 33 extending between them passes below the axis of the pivot 27 when the door is in its open position so that, when the door is open, the spring 33 will resiliently hold it in that position. It is also desirable that the lug 34 and ear 35 be so located that, when the door is closed, the spring passes above the axis of the pivot 27, as shown in Figure 3, so that, when the door is almost closed, the spring 33 will tend to close it.

The above described arrangement of the spring 33 and the lug 34 and ear 35 between which it extends provides an over-center arrangement, since the spring 33 swings past the axis of the pivot 27 as the door is opened. When the spring 33 is directly in line with the axis of the pivot 27, the force which the spring exerts on the door neither tends to open it or close it. This is the dead-center position. When the door 18 is not opened as far as its dead-center position, the spring tends to close it, and when it is opened past its dead-center position, the spring tends to open it the remainder of the way. Therefore, in opening the door, it is merely necessary to push it back from the full line position shown in Figure 3 to the dotted line position and to swing it up past its dead-center position, whereupon the springs will open it the remainder of the way. In closing the door, it is merely necessary to pull it down, by means of its lower flange 24, past its dead-center position, whereupon the springs will close it the remainder of the way and snap it forward into position within the door opening.

At the center of the instrument panel 11, shown in Figures 1 and 2, there is an opening into which a door 39 fits. The edges of the panel 11 around the door opening are bent back to form flanges at the top and bottom and at the ends of the opening, the flanges 41 at the ends of the opening extending back a considerable distance and forming supporting members similar to the supporting members 22 at the sides of the opening for the door 18 described above.

The door 39 is constructed in the same manner as the door 18 for the storage compartment and is provided with integral rearwardly directed supporting members 42 at each side similar to the supporting members 25 on the storage compartment door 18. The supporting members 41 and 42 integral with the instrument panel 11 and the control panel door 39 are interconnected in exactly the same way as the corresponding supporting members 22 and 25 for the storage compartment so that the control panel door 39 can be swung up in exactly the same way.

A control panel 43 is mounted directly behind the door opening and carries knobs or other control members 44. The two upper knobs may control the volume and tuning of the radio, the center control may control the ignition, and the two lower knobs may be used to operate the light switch and the throttle. The control or sub-panel 43 is rigidly connected to the instrument panel 11 in any suitable manner as, for example, by being fixed to the flange 45 at the bottom of the door opening or by being mounted on brackets fixed to the main panel 11.

Two other embodiments of my invention are shown in Figures 5 and 6. These are disclosed in my copending application, Serial No. 138,765, entitled "Closure means" filed April 24, 1937, now Patent No. 2,161,770, and these forms constitute divisional subject matter taken from said earlier application. The embodiment of the invention shown in Figure 5 comprises a disappearing cover which is employed to close the opening in a panel member which affords access to a glove compartment or the like. In this construction, a detachable and removable glove and article receptacle 51 is shown mounted behind a panel member 52 which is provided with an aperture opposite the open end of the glove and article receptacle 51. The glove receptacle 51 is supported by means of a bracket which is channel-shaped in cross section and comprises a top plate or web 53 and side flanges 54 depending from the web 53 and forming supporting brackets. An aperture closing member or cover 55 is mounted for movement into and out of the aperture in the panel 52 and includes in general an aperture closing portion 56 and a pair of supporting arms 57 which are pivotally mounted on a rod 58 which extends between the rearwardly projecting ends of the sides 54 of the bracket. Guide slots 59 are provided in the intermediate portions of the arms 57 and are arranged to ride over guide pins 60 secured to the bracket sides 54. The entire operation of the cover 55 as to its angular and translatory movement is generally similar to that of the storage compartment cover 18 described above and illustrated in Figures 3 and 4. It differs from that, however, in that the cover 55 in the embodiment of the invention shown in Figure 5 drops down instead of swinging up and in that its angular movement is much less while its translatory movement is great enough to carry it entirely outside of and beyond the glove compartment 51. It will be noted, that in this form of the invention, the entire guiding and supporting mechanism for the door 55 lies outside of the glove compartment 51, leaving the interior of the glove compartment completely unobstructed.

A further embodiment of the present invention is shown in Figure 6 of the drawings wherein a disappearing cover 62 is provided for the aperture 63 in a panel 64, a sub-panel 65 carrying a radio dial 66 and control knobs 67 being disposed behind the aperture 63 and the plane of the panel 64. Suitable locking mechanism 68 may be provided for locking the cover member 62 in its closed position to prevent unauthorized access to the radio controls 67.

While I have shown only three separate embodiments of my invention, differing from each other in several respects, it will, of course, be understood that I do not wish to be limited thereto and that the invention includes numerous other modifications and equivalents. For example, features, such as the lock 68 shown in Figure 6, employed in one embodiment of the invention may be employed in other embodiments and other combinations and variations may readily be devised by the skilled mechanic. Since many such modifications may be made, I claim as my invention all such modifications as fall within the true scope and spirit of any one of the appended claims.

I claim as my invention:

1. In an automobile body construction, an instrument panel having a generally smooth surface free from projections, said panel having an aperture, a sub-panel mounted behind said aperture, control members carried by and projecting from said sub-panel, said control members lying entirely behind the plane of said instrument panel, a cover fitting in said aperture in the plane of said instrument panel and having a smooth surface free from projections and forming a continuation of the smooth surface of said instrument panel, supporting members behind and fixed with respect to said instrument panel, supporting members behind and fixed with respect to said cover, and cooperating means on said supporting members for guiding said cover in a short movement back out of said aperture and a long curved movement at an angle to said first movement and away from behind said aperture.

2. An automobile instrument panel assembly comprising a main panel having an aperture, a sub-panel mounted behind said aperture, control members carried by and projecting from said sub-panel, said control members lying entirely behind the plane of said main panel, a cover fitting in said aperture in the plane of said main panel, supporting members behind and fixed with respect to said main panel, supporting members behind and fixed with respect to said cover, and cooperating means on said supporting members for guiding said cover in a short movement back out of said aperture and a long curved movement at an angle to said first movement away from behind said aperture for exposing said control members.

3. In an automobile body construction, an instrument panel having a generally smooth surface free from projections, said panel having an aperture, a sub-panel mounted behind said aperture, control members carried by and projecting from said sub-panel, said control members lying entirely behind the plane of said instrument panel, a cover fitting in said aperture in the plane of said instrument panel and having a smooth surface free from projections and forming a continuation of the smooth surface of said instrument panel, supporting members behind and fixed with respect to said instrument panel, supporting members behind and fixed with respect to said cover, and cooperating means on said supporting members for guiding said cover in a short movement back out of said aperture and for thereafter limiting the movement of said cover to rotation about a substantially horizontal axis, said axis being substantially parallel to said instrument panel and being located substantially at the level of the center of said aperture at a distance behind said panel equal to approximately half of the height of said aperture whereby said cover may be rotated to a substantially horizontal position behind and substantially in line with the top of said aperture and above said sub-panel.

4. In an automobile instrument panel assembly adapted to extend across an automobile body ahead of the front seat and eccentrically located steering column thereof, a main panel having exposed instruments thereon grouped at the end of said panel adapted to be located ahead of said steering column, a sub-panel and a storage compartment mounted in back of said main panel, control members carried by and projecting from said sub-panel, said control members lying entirely in back of the plane of said main panel, said main panel being apertured to allow access to said sub-panel and said storage compartment, closure means covering said sub-panel and control members and said storage compartment, said closure means lying in the plane of said main panel and providing therewith a substantially smooth non-frangible surface adapted to be located in front of the portion of said seat not located behind said steering column, whereby said instrument panel assembly will form a relatively safe abutment for stopping the motion of a passenger thrown forward from said seat by a sudden deceleration of said automobile, and cooperating means on the back of said main panel and said closure means for guiding said closure means in a short movement back out of the plane of said main panel and a long curved movement at an angle to said first movement and away from in front of said sub-panel and the opening of said storage compartment.

5. In an automobile instrument panel assembly, a main panel, a sub-panel and a storage compartment mounted in back of said main panel, control members carried by and projecting from said sub-panel, said control members lying entirely in back of the plane of said main panel, said main panel being apertured to allow access to said sub-panel and said storage compartment, closure means covering said sub-panel and control members and said storage compartment, said closure means lying in the plane of said main panel and providing therewith a substantially smooth surface, supporting members in back of and fixed with respect to said main panel, and cooperating means on said supporting members for guiding said closure means in a short movement back out of the plane of said main panel and a long curved movement at an angle to said first movement and away from in front of said sub-panel and control members and the mouth of said storage compartment.

6. Mechanism for supporting and guiding a closure for movement out of and away from an aperture and back again comprising supporting members behind and fixed with respect to said aperture, supporting members behind and fixed with respect to said closure, a pin and slot connection between said supporting members comprising a pin on one member slidable and rotatable in a slot in the other member, said connection being located behind the center line of said aperture and being distant from the plane of said aperture a distance equal to approximately half of the width of said aperture, a second pin and slot connection between said supporting members, the slot in said second pin and slot connection having a portion approximately equal in length to and parallel to the slot in said first pin and slot connection for preventing rotation or swinging of said closure during the movement thereof out of said aperture, the slot in said second pin and slot connection also having a relatively long arcuate portion concentric with the pin of said first pin and slot connection when said closure is moved back out of said aperture, said arcuate portion being approximately a quarter of a circle.

7. A mechanism for guiding a closure in a movement bodily back out of an opening and in a swinging movement to a position behind one side of and at a large angle to the plane of said opening, said mechanism comprising supporting means behind and fixed with respect to said opening, supporting means behind and fixed with respect to said closure, and two different pin and slot connections between said supporting means, the slots of both of said connections having a portion extending approximately at right angles to the plane of said opening and as long as said movement back out of said opening, and the slots of both of said connections also having curved portions disposed about the axis of said swinging movement.

8. A mechanism as described in claim 7 and in which said axis lies at the end of one of said slots and the curved portion of said slot is said end thereof.

9. A mechanism as described in claim 7 and having a tension spring extending from a point on the movable portion of said mechanism behind said axis to a point on the stationary portion of said mechanism ahead of said axis, said point being located so that said spring passes at one side of said axis when said closure lies in said opening and so that said spring passes at the other side of said axis when said closure is swung to one side of said opening.

10. In a mechanism for guiding a closure in a movement bodily back out of an opening and in a swinging movement to a position behind one side of and at an angle to the plane of said opening, a spring connected to a point rigid with said closure and in back of the axis of said swinging, said spring also being connected to a fixed point located so that a line joining said two points passes at one side of said axis when said closure is in said opening and passes at the other side of said axis when said closure is in said position behind one side of and at a large angle to the plane of said opening.

11. In an instrument panel assembly having one end adapted to be located behind and to be protected by the steering wheel of a vehicle and having an adjoining portion adapted to be located in a position not protected by said wheel, the improvement comprising means defining an opening in said adjoining portion for exposing instrument controls located behind said opening, a disappearing closure member mounted behind said panel for movement from behind said panel into said panel aperture over said controls, and means for bodily moving said closure member into said panel aperture as the closure member is moved to its aperture closing position, whereby the external surface of said closure member is substantially flush with that of said panel when said member is in closed position.

12. In a mechanism for supporting a closure for bodily movement back out of an opening in a given member and to position at the rear of the plane of the opening, means supporting the closure for a rearward movement toward a pivot axis about which the closure is adapted to be swung and means for defining an arcuate path of swinging movement for the closure to swing about said pivot axis, said path being of such curvature that when the closure is at one extremity of said path it is substantially parallel to the plane of said opening and when adjacent the other extremity of said path it is rearwardly of the plane of the opening and at substantially right angles thereto so as to afford substantially an obstructed entry through said opening.

13. In a mechanism for supporting a closure for bodily movement back out of an opening in a given member and to position at the rear of the plane of the opening, means supporting the closure for a rearward movement toward a pivot axis about which the closure is adapted to be swung and means for defining an arcuate path of swinging movement for the closure to swing about said pivot axis, said path being of such curvature that when the closure is at one extremity of said path it is substantially parallel to the plane of said opening and when adjacent the other extremity of said path it is rearwardly of the plane of the opening and at substantially right angles thereto so as to afford substantially an obstructed entry through said opening, said first means including a rocking support for said closure and said arcuate path being defined by a curved track along which the closure is swung.

JOHN VISSER.